June 12, 1923.
W. D. PICKARD
SHADE ATTACHMENT
Filed July 10, 1922
1,458,845
Fig. 1.
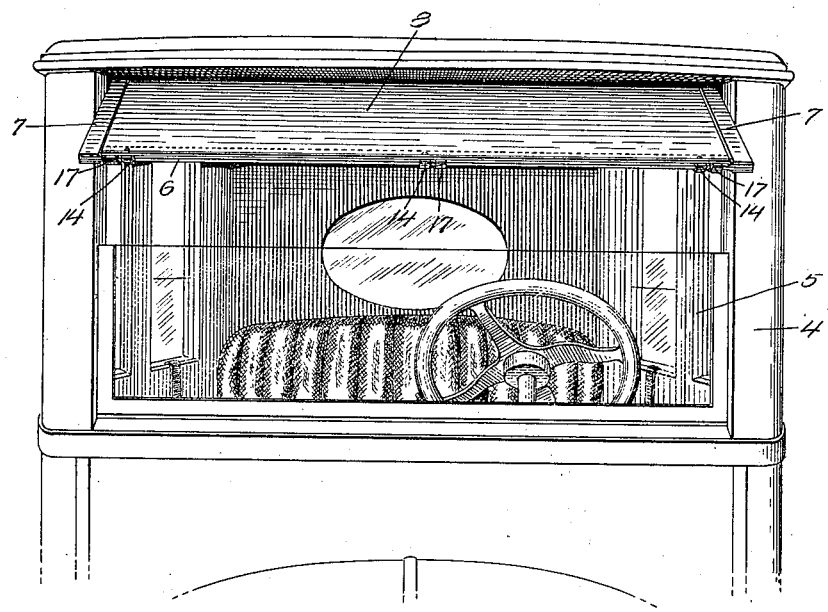
Fig. 2.
Fig. 3.
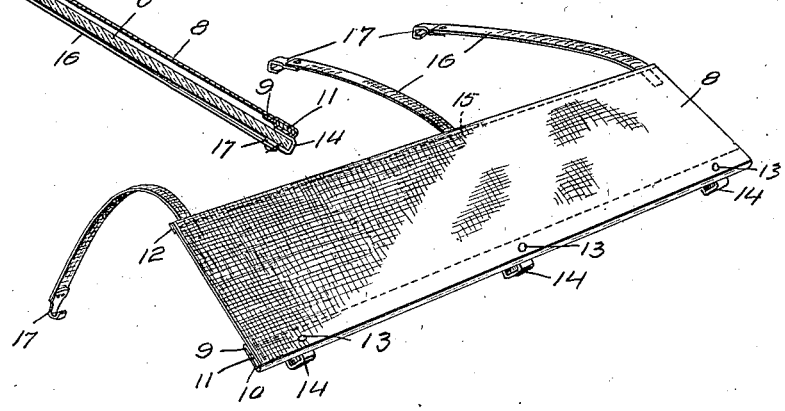
W. D. Pickard. INVENTOR.
BY
Geo. F. Kimmel
ATTORNEY.

Patented June 12, 1923.

1,458,845

UNITED STATES PATENT OFFICE.

WINFORD D. PICKARD, OF NORMAN, OKLAHOMA.

SHADE ATTACHMENT.

Application filed July 10, 1922. Serial No. 574,028.

*To all whom it may concern:*

Be it known that I, WINFORD D. PICKARD, a citizen of the United States, residing at Norman, in the county of Cleveland and State of Oklahoma, have invented certain new and useful Improvements in Shade Attachments, of which the following is a specification.

This invention relates to a shade attachment, for use in connection with the wind shields of motor vehicles, of that type of shield formed of an upper and lower section, and has for its object to provide, in a manner as set forth, a removable shade attachment capable of being detachably secured to the upper section of a wind shield for protecting the eyes of the driver and occupants of the vehicle, against the glare of the sun, more especially when driving in the early morning or late afternoon, as at that time of day, the sun often blinds the eyes of the driver.

A further object of the invention is to provide a shade attachment for wind shields of motor vehicles for overcoming, at night, the glare from head lights of approaching vehicles whereby on the adjusting of the shade carried by the shield, such glare can be entirely eliminated, adding greatly to the safety and comfort of the occupants of the vehicle.

Further objects of the invention are to provide a shade attachment for the wind shield of a motor vehicle, which is extremely simple in its construction and arrangement, strong, durable, quickly attached and removed from the shield, efficient in its use, and inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a portion of the body of a motor vehicle, said body provided with a sectional wind shield and showing the adaptation of a shade attachment in accordance with this invention with respect to one of the sections of the shield, Figure 2 is a cross sectional view of a wind shield section showing detachably connected therewith a shade attachment in accordance with this invention, said attachment being shown in section, Figure 3 is a perspective view of a shade attachment in accordance with this invention.

Referring to the drawings in detail, 4 denotes a motor vehicle provided with a wind shield formed of a lower section 5 and an upper section 6, the latter includes a frame 7 in which is mounted the transparent element of the shield and to said wind shield section 6 is adapted to be detachably secured on its outer face, a shade attachment in accordance with this invention.

The shade attachment consists of a rectangular body 8 formed of flexible material of opaque or translucent characteristic, and which has the outer marginal portion thereof, bent upon and secured to itself at 9, to provide a pocket 10 for a reinforcing element 11 which extends through the pocket 10. The body portion 8 at the rear thereof is bent upon and secured to itself as at 12 to reinforce said rear end of said body 8.

The body portion 8 is adapted to be detachably secured on the outer face of the wind shield section 6 and is of a length to extend from one side bar to the other side bar of the frame 7, and of a width equal to the width of the transparent element of the shield 6.

The outer portion of the body 8 has secured thereto, by the hold-fast devices 13, the upper legs or arms of a series of rearwardly opening yoke-shaped coupling members 14, as shown by way of example three in number, and which are adapted to engage over the normal lower edge of shield 6, as illustrated in Figure 2, whereby the outer portion or front of body 8 will be detachably secured to the shield 6. The hold-fast devices 13 also secure the reinforcing element 11 in position. The rear or inner side of the body portion 8 has secured thereto, as at 15, the ends of a series of elastic strap members 16, as shown three in number and each of which has its free end provided with a hook 17 which engages with the lower edge of the shield 6, as shown in Figure 2, whereby the body portion 8 is secured to said shield section 6. The straps 16 extend around the upper edge of the shield section 6 and against the rear face thereof, as clearly shown in Figure 2. The upper legs or arms of the coupling members 14 space the body 8 from the wind shield section so that the hook 17 can be positioned to extend between the wind shield section and the body 8.

The shade attachment, when secured to the wind shield section 6 performs its functions, when the section 6 is raised or lowered to position the shade in the path of the rays of the sun and which will prevent the passage thereof through the section 6, under such conditions protecting the driver and the occupants of the vehicle from the sun rays. As to eliminating the glare from the head lights of approaching cars, the section 6 is lowered whereby the glare will strike the shade, protecting the driver and occupants of the vehicle, and add greatly to the safety and comfort thereof. The shield can be adjusted that is, raised or lowered, while operating the car.

The attachment can be quickly connected to the shield 6 or readily disconnected therefrom, and when not in use, can be folded and placed under a seat in the vehicle.

What I claim is:—

1. A shade attachment for wind shields of motor vehicles, comprising a rectangular body of non-transparent material adapted to be mounted against one face of the upper section of a wind shield, a plurality of rearwardly opening yoke-shaped coupling members having their upper legs or arms arranged against the lower face of said body at the forward portion thereof, said members projecting beyond the forward edge of said body and adapted to overlap one edge of the wind shield section for securing said body therewith, means for securing the upper legs of said coupling members to said body, and a plurality of resilient elements secured to the lower face of said body at the rear thereof and projecting beyond the rear edge of said body, each of said resilient elements having its free end provided with a hook detachably engaging with that edge of the wind shield section to which the coupling members are connected, the said upper legs or arms of the coupling members spacing said body from the wind shield section whereby the hooks when mounted in engaging position will be interposed between said body and the wind shield section.

2. A shade attachment for wind shields of motor vehicles, comprising a rectangular body of non-transparent material adapted to be mounted against one face of the upper section of a wind shield, a plurality of rearwardly opening yoke-shaped coupling members having their upper legs or arms arranged against the lower face of said body at the forward portion thereof, said members projecting beyond the forward edge of said body and adapted to overlap one edge of the wind shield section for securing said body therewith, means for securing the upper legs of said coupling members to said body, and a plurality of resilient elements secured to the lower face of said body at the rear thereof and projecting beyond the rear edge of said body, each of said resilient elements having its free end provided with a hook detachably engaging with that edge of the wind shield section to which the coupling members are connected, the said upper legs or arms of the coupling members spacing said body from the wind shield section whereby the hooks when mounted in engaging position will be interposed between said body and the wind shield section, said body formed of flexible material and having a reinforcing member inclosed therein at the forward longitudinal edge thereof and through which extends the means for securing said coupling members in position.

In testimony whereof I affix my signature hereto.

WINFORD D. PICKARD.